Sept. 13, 1955          A. G. CLAVIER          2,718,002
                 LONG RANGE NAVIGATION SYSTEM
Filed Feb. 2, 1949                              3 Sheets-Sheet 1

INVENTOR.
ANDRÉ G. CLAVIER
BY
ATTORNEY

Sept. 13, 1955  A. G. CLAVIER  2,718,002
LONG RANGE NAVIGATION SYSTEM
Filed Feb. 2, 1949  3 Sheets—Sheet 2
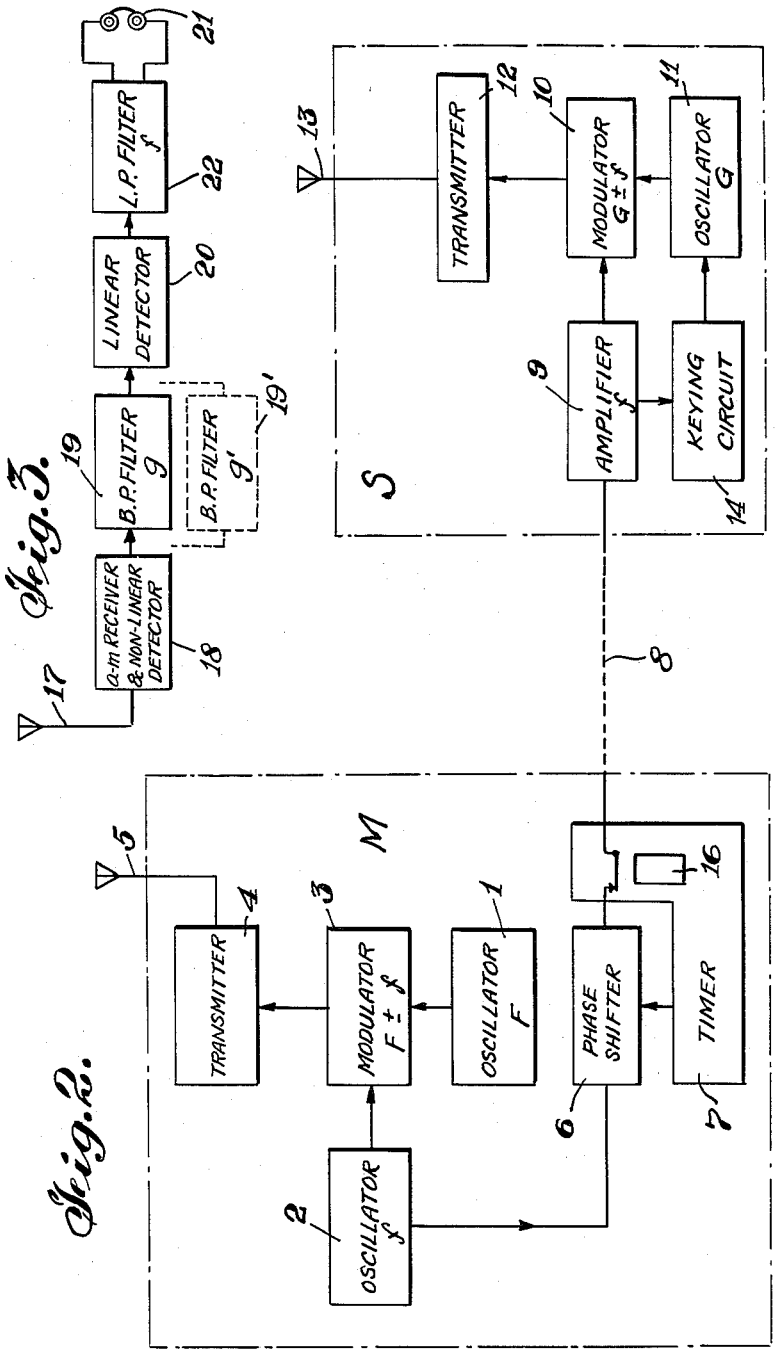
INVENTOR.
ANDRÉ G. CLAVIER
BY
ATTORNEY

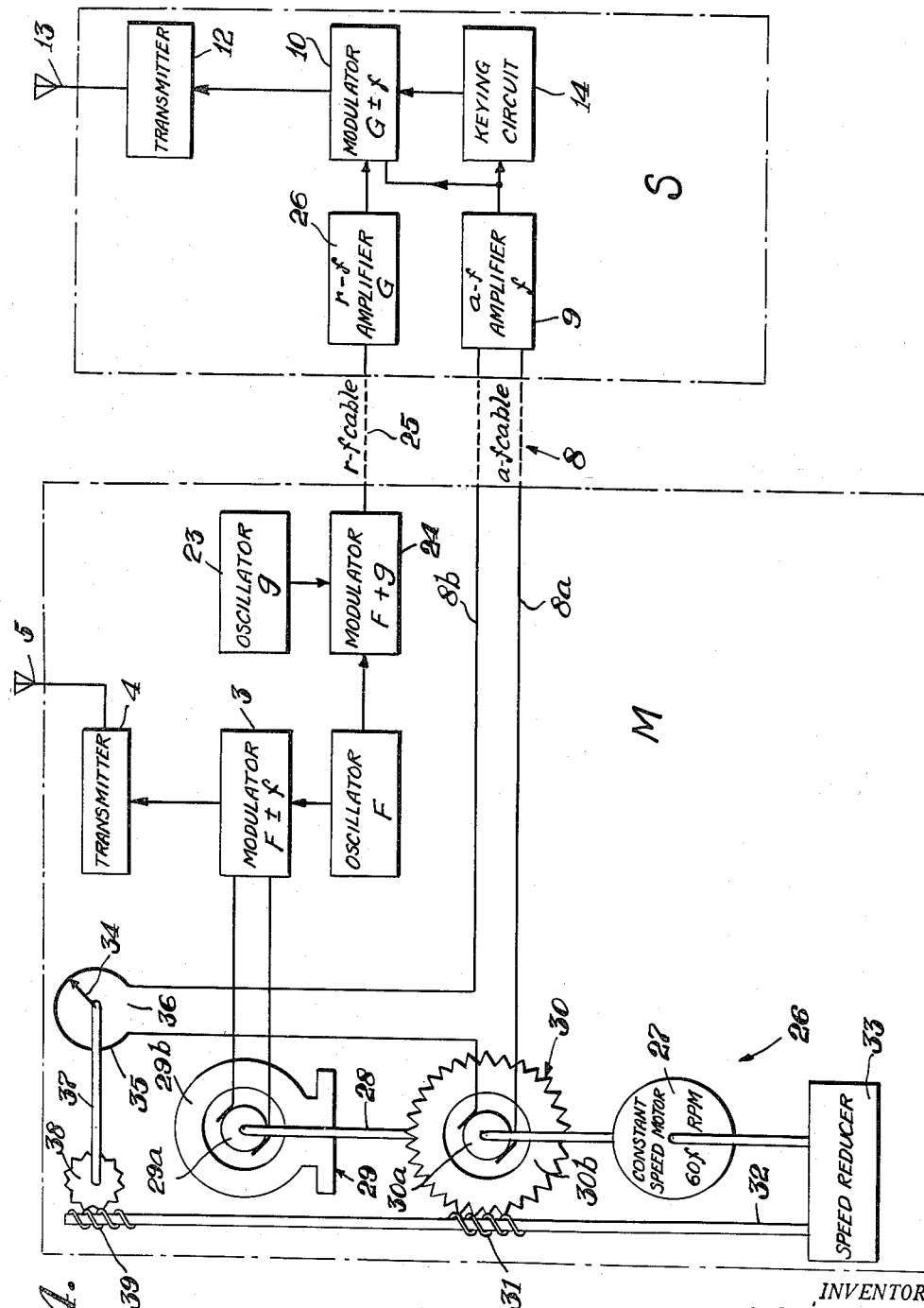

United States Patent Office 2,718,002
Patented Sept. 13, 1955

2,718,002

LONG RANGE NAVIGATION SYSTEM

André G. Clavier, Nutley, N. J., assignor to International Standard Electric Corporation, New York, N. Y., a corporation of Delaware Application February 2, 1949, Serial No. 74,177

19 Claims. (Cl. 343—105)

The present invention relates to long range navigation systems, particularly for the orientation of aircraft, although it is equally applicable to surface craft and vehicles.

The general object of the invention is to provide a long range navigation system wherein the equipment of the movable receiving station is of the simplest kind and wherein the use of directional antennae both at the transmitting and at the receiving end is dispensed with. A related object is to provide a system of this character using amplitude modulated medium of long waves.

Briefly, the invention provides a method of navigation comprising the transmission of signals defining a hyperboloid course.

According to a more specific aspect of the invention, two carrier waves of different frequency, both amplitude modulated by respective signal waves having the same low frequency, are sent out from a first and a second transmitting station, respectively, the phase relationship between the two modulating frequencies being continuously varied at a predetermined rate so as to give rise to a beat frequency which, on being detected at a receiving station, appears amplitude modulated by the said low frequency, the latter in turn having an amplitude which will assume an extreme value (e. g. become a minimum or zero) a given interval after a reference time at which the relative phase of said two modulating frequencies has a predetermined value, the locus of all points for which the said interval is the same being a hyperbola whose foci are the two transmitting stations and whose apex is determined by the value of said interval.

According to another aspect of the invention, there is provided a first transmitting station having means for sending out a first carrier wave, a second transmitting station having means for sending out a second carrier wave, means for modulating the two carrier waves with respective signal waves having the same low frequency, means for shifting the relative phase of said signal waves at a predetermined rate, means for indicating to a mobile receiving station the instant when said relative phase has a predetermined value, non-linear detector means at the receiving station for beating together the two carrier waves, means for linearly detecting the amplitude modulation of the resulting beat frequency, whereby a signal wave of the said low frequency will be reproduced at the receiving station, and indicator means for determining the instant at which the amplitude of the last-mentioned wave assumes an extreme value, the interval between said two instants defining a hyperboloid course on which the receiving station is located.

By using two pairs of transmitting stations, the precise location of the receiving station may be ascertained as the point of intersection of two hyperboloid courses or signal paths determined in the manner set forth above. Actually, only three transmitting stations will be required in such an arrangement, one station being common to both signal paths.

The invention will be described with reference to the accompanying drawings in which:

Fig. 2 shows, schematically, one form of a first and second transmitting station in a system according to the invention;

Fig. 3 shows, schematically, a receiving station in a system according to the invention;

Fig. 4 shows a modification of the pair of transmitting stations illustrated in Fig. 2.

Figure 1:
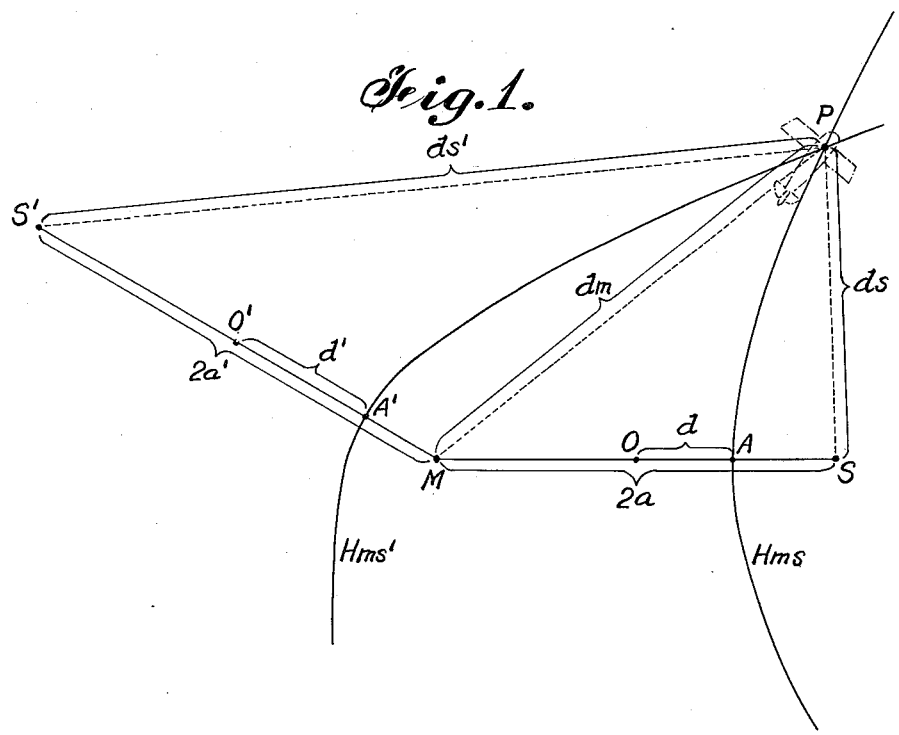
Fig. 1 is a diagram used to illustrate the theory of operation of a system to the invention.

Referring to Fig. 1, there is shown a main or master transmitting station M and a slave or auxiliary transmitting station S, the distance between the two stations being designated $2a$. A mobile receiving station is carried by an aircraft located at a remote point P. The distance of point P from stations M and S is designated $dm$ and $ds$, respectively.

Let us now assume that station M transmits a carrier wave of frequency $F=\omega/2\pi$ amplitude modulated by a signal frequency $f=p/2\pi$, and that station S transmits a carrier wave of frequency $G=F+g$ modulated by a like signal frequency $f$, the two signal frequencies being relatively displaced by a phase angle $\varphi$. The outgoing field at station M may be written as $$E_M = A_M(1+m' \cos pt)\cos \omega t \quad (1)$$

and that at station S as $$E_S = A_S[1+m'' \cos (pt+\varphi)]\cos[(\omega+q)t\varphi] \quad (2)$$

$m'$ and $m''$ being the respective modulation coefficients, with $\varphi$ the relative phase displacement between the two carriers, and $q=2\pi g$.

If the two fields are vertically polarized, and disregarding any parasitic signal paths that may exist, the resultant of the two fields at point P may be written as follows:

$$E_p = E_{MP} + E_{SP} \quad (3)$$

wherein $$E_{MP} = A_{MP}[1+m' \cos p(t-t')] \cos \omega(t-t') \quad (4)$$

$$t' = \frac{dm}{c} \quad (5)$$

($c$ being the velocity of light) and $$E_{SP} = A_{SP}[1+m'' \cos \{p(t-t'')+\varphi\}] \cos [(\omega+q)(t-t'')+\varphi] \quad (6)$$

$$t'' = \frac{ds}{c} \quad (7)$$

Let $$B_{MP} = A_{MP}[1+m' \cos p(t-t')] \quad (8)$$

and $$B_{SP} = A_{SP}[1+m'' \cos \{p(t-t'')+\varphi\}] \quad (9)$$

then $$E_p = B_{MP} \cos (\omega t - \omega t') + B_{SP} \cos [(\omega+q)t-(\omega+q)t''+\varphi] \quad (10)$$

A demodulation of this combination of frequencies in a non-linear (e. g. square-law) detector, followed by the passage of the demodulation products through a suitable band pass filter which will reject the signal frequency $f$ as well as the sum of the carrier frequencies FG and other radio frequencies, will yield an output $$V_1 = B_{MP}B_{SP} \cos [qt+\omega t' - (\omega+q)t''+\varphi] \quad (11)$$

which may be written as $$V_1 = A_1 \cos (qt+\eta) \quad (12)$$

Substituting for $B_{MP}$ and $B_{SP}$ the values from Equations 8 and 9, respectively, we can write for the amplitude $A_1$ of the beat frequency $g=q/2\pi$ the following:

$$A_1 = 1 + \frac{m'm''}{2}\cos[p(t'-t'')+\varphi] + \frac{m'm''}{2}\cos[2pt - p(t'+t'')+\varphi] +$$

$$\sqrt{m'^2 + m''^2 + 2m'm''\cos[p(t'-t'')+\varphi]}\cos(pt+\theta) \quad (13)$$

the residual phase angle $\theta$ is a function of $t'$, $t''$ and $\varphi$.

Thus, the envelope $A_1$ of wave $V_1$, which is detectable by linear demodulation of this wave, contains the pulsations $p$, $2p$ and $d\varphi/dt$, the latter being, however, a very slow oscillation which is of no further significance. A suitable low-pass filter will stop the frequency $2f$ and select the frequency $f$, the latter having an amplitude varying in accordance with the root member of Equation 13. This member assumes a minimum value for all values of $\varphi$ satisfying the expression $$p(t'-t'') + \varphi = (2k+1)\pi \quad (14)$$

($k$ being any integer including zero) and disappears entirely for such values if $m'=m''$. Thus the signal eventually obtained will be of the form $$V_2 = m'\sqrt{2+2\cos(pt'-pt''+\varphi)}\cos(pt+\theta) \quad (15)$$
$$= F(\varphi)\cos(pt+\theta)$$

Substituting in Equation 14 the values for $t'$ and $t''$ from Equations 5 and 7, and setting $k=0$, we obtain $$dm - ds = \frac{c}{p}(\pi - \varphi) = 2d \quad (16)$$

which, with $\varphi$ constant, is the formula of a hyperbola centered on $0$ (Fig. 1), with axis $2d$ and the foci M and S. This hyperbola, shown at H$ms$, is the locus of all points P for which the signal $V_2$ gives a null at a given value of the phase difference $\varphi$.

Because the maximum value for the length $2d$ is the focal distance $2a$, we can write $$\varphi_{1,2} = \pi \pm \frac{2ap}{c} \quad (17)$$

wherein $\varphi_1$ and $\varphi_2$ are the two values of $\varphi$ at which the apex A, Fig. 1, will coincide with the focal points M and S, respectively. Selecting, for convenience, $$\varphi_1 = 3\pi/2 \quad (18)$$

and $$\varphi_2 = \pi/2 \quad (19)$$

we obtain $$\frac{c\pi}{2p} = 2a \quad (20)$$

or, since $p=2\pi c/\lambda$ ($\lambda$ being the wave length of the oscillation $p=2\pi f$), $$\lambda/4 = 2a \quad (21)$$

that is to say the low frequency modulating signal has a wave length four times the distance between the stations M and S.

Under the circumstances last stated, a complete sweep of an area extending over 360 degrees will therefore involve a cycle of operations in which the relative phase of the two low-frequency modulations is shifted from $\pi/2$ to $3\pi/2$, or vice versa. If the distance between the two transmitting stations is, for example, 600 kilometers, the frequency $f$ of the modulating signal will thus be 125 cycles per second.

It will be understood that, if the rate of phase shift is known to the navigator aboard the craft and if a reference signal is sent out at the time the phase $\varphi$ goes through one of the two critical values referred to, the navigator, for example by starting a chronometer at the instant this reference signal is received, may determine the time required for the signal $V_2$ to go to zero and thereby ascertain the hyperbola H$ms$ on which the craft is located. In completely analogous manner, a second hyperbola H$ms'$ may be determined by means of a second slave station S' associated with master station M but operating on a different carrier frequency $G'=F+g'$, whereby the precise position P of the craft may be ascertained. In Fig. 1 the distance between point P and station S' is designated $ds'$, $d'$ being the distance between center O' and apex A', and $2a'$ being the distance between stations M and S'. Instead of providing different beat frequencies $g$, $g'$, the two signal paths H$ms$, H$ms'$ may also be distinguished, for example, by using different synchronizing signals.

A practical embodiment of a master station M and associated slave station S is illustrated in Fig. 2. In this figure, station M comprises an oscillator 1 representing a source of carrier frequency F, a second oscillator 2 producing the modulating frequency $f$, a modulator 3 fed by both oscillators so as to apply the modulated carrier frequency $f+F$ to the transmitter 4 for radiation over an antenna 5, and a phase shifter 6 controlled by a timer 7.

Oscillations from the low-frequency source 2, after passing through the phase shifter 6, are transmitted to the auxiliary station S over a preferably metallic transmission path 8. At the latter station, the phase shifted modulating signal is amplified by an amplifier 9 and is then applied to a modulator 10, along with a carrier frequency G obtained from a local oscillator 11. The output of modulator 10 is fed to the transmitter 12 for radiation over aerial 13.

Figure 5:
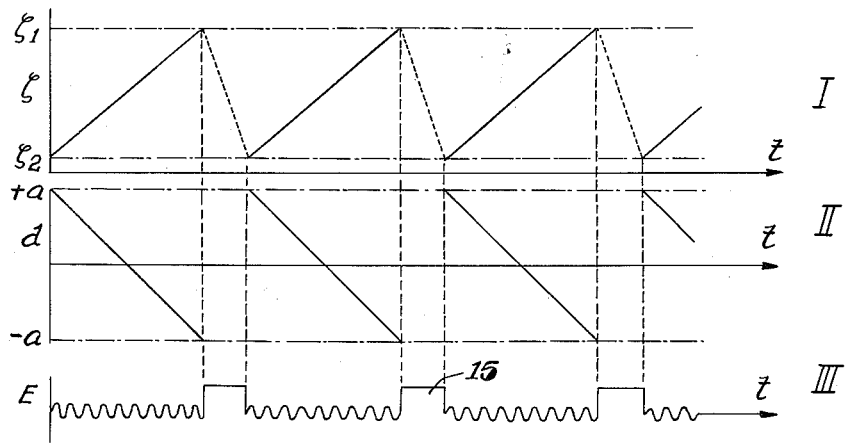
Fig. 5 is a diagram illustrating the mode of operation of the system shown in Figs. 2 and 3.

Station S also comprises a keying circuit 14 which controls the output of oscillator 11 in such manner as to produce a signal pulse 15 (Fig. 5) at a predetermined point in the cycle of operation of the timer 7. For this purpose the timer 7 is shown to comprise a relay 16 adapted to interrupt, periodically, the connection between phase shifter 6 and amplifier 9. The keying circuit 14, which may comprise suitable differentiation means well known per se, is so controlled from the amplifier 9 that operation of the relay 16 will result in a characteristic operation of circuit 14 giving rise to the pulse 15. Referring to Fig. 5, the graph III shows the signals 15 (which may be modulations of the carrier G by a suitable audio frequency different from $f$) so synchronized with the phase shifting cycle illustrated in graph I that, at the end of the signal pulse, the phase shift will have the critical value $\pi/2$, changing thence to the other critical value $3\pi/2$ at a linear rate. Graph II shows the simultaneous values for the distance $d$ which follow directly from Equation 18.

Fig. 3 shows the airborne receiving station, comprising a receiving antenna 17 feeding a receiver 18 of amplitude modulated waves, including a non-linear detector, a band pass filter 19 applying waves of frequency $g$ from the receiver 18 to a linear detector 20, and an indicator 21, shown here as a pair of earphones, connected to the output of detector 20 by way of a low pass filter 22 designed to pass waves of frequency $f$. The operation of the receiving station shown in Fig. 3 will be understood without further explanation from the foregoing description.

It may be added that the low pass filter 22 should also pass the oscillations representing the pulse 15 and that the circuits 20, 22 may be designed to pass a sufficiently large portion of beat frequency $g$ to give an audible indication when the system is in operation; for this purpose, the difference between two carrier frequencies F and G should be in the audio range, e. g. of the order of several kilocycles per second.

Fig. 3 also shows a second filter 19', tuned to beat frequency $g'$, which may be substituted for filter 19 when it is desired, for example, to locate the second hyperbola H*ms'* shown in Fig. 1. The modulating frequency *f* will, of course, be the same in both cases.

In Fig. 4, wherein elements having equivalents in Fig. 2 have been given the same reference numerals, all oscillations are generated at the main station M and transmitted to the auxiliary station S over metallic circuits. The main station, accordingly, comprises an oscillator 23, which generates the difference frequency *g*, and a modulator 24 which takes the place of oscillator 11 in Fig. 2 and is connected to both oscillators 1 and 23 to produce the carrier frequency G. The latter frequency is transmitted to the modulator 10 over a radio frequency cable 25 and an amplifier 26, the channel 8 being here shown as an audio frequency cable comprising conductors 8*a* and 8*b*.

By way of further modification, the oscillator 2, phase shifter 6 and timer 7 have been replaced in Fig. 4 by a motor-generator assembly 26 comprising a constant speed motor 27 operating at *f* revolutions per second or 60*f* revolutions per minute. Driven from the motor 27, by means of a shaft 28, is a constant-phase generator 29, supplying oscillations at frequency *f* to the modulator 3, and a variable-phase generator 30, feeding oscillations of a similar frequency but varying phase to the cable 8. Generator 29 comprises a rotor 29*a* and a fixed stator 29*b*; generator 30 comprises a rotor 30*a* and a rotatable stator 30*b*, the latter having a toothed periphery engaged by a worm 31 which is carried on a shaft 32. Shafts 28 and 32 are coupled together by means of a speed reducer 33.

Also as shown in Fig. 4, the relay 16 has been replaced by a rotary switch comprising a wiper 34, carried on a shaft 37, and an arcuate conductor 35 having a gap 36. This switch is inserted in the conductor 8*b* and operated in substantially the same manner as the armature of relay 16 to trigger the keying circuit 14, it being understood that the position of the gap 36 is selected so that the resulting signal pulse coincides with a characteristic phase difference as previously set forth. For this purpose the shaft 37 is fixed to a gear 38 which meshes with a second worm 39 carried on shaft 32. The transmission ratio of worm 39 and gear 38 is selected so that wiper 34 will make a full rotation when the stator 30*b* turns through an angle of 360 electrical degrees; thus, if the generator 30 has a single pair of poles, stator 30*b* and wiper 34 will rotate in unison.

It should be borne in mind that the predetermined values for the phase angle $\varphi$ do not refer to the phase difference between the outputs of generators 29 and 30 but, rather, to the phase difference of the two oscillations of frequency *f* as applied to the modulators 3 and 10, respectively, thus taking into account the phase shift occurring in the audio frequency cable or transmission channel 8. The same consideration applies, of course, to the embodiment of Fig. 2. Also, in Fig. 4, it will be noted that the width of the synchronization pulse 15, determined by the width of the gap 36, may be considerably less than the time required for passing from the first critical value $\varphi_1$ (e. g. $3\pi/2$) to the second critical value $\pi_2$ (e. g. $\pi/2$), corresponding to a rotation of 180 degrees by the shaft 37; this, however, is of no significance as long as the synchronization signal is accurately timed to indicate one or the other of these values, as by having the end of the pulse 15 coincide with the phase relationship $\varphi = \varphi_2$ as illustrated in Fig. 5.

Finally, it will be understood that employing two signals of the same frequency and shifting the relative phase thereof at a linear rate is electrically equivalent to using two signals of slightly different frequency and constant phase.

While the invention has been described with reference to certain preferred embodiments, it is to be understood that the same is capable of various modifications and adaptations without departing from its spirit within the scope of the appended claims.

What I claim is:

1. A method of navigation which comprises the steps of modulating distinct carrier waves with respective low frequency waves, cyclically varying the relative phase of said low frequency waves, transmitting said distinct modulated carrier waves from a plurality of spaced points, transmitting a synchronizing signal at a time of predetermined phase relation of said low frequency waves, simultaneously receiving said transmitted carrier waves, receiving and synchronizing signal, demodulating said waves as to obtain a beat frequency from said phase varied low frequencies, and comparing said received synchronizing signals and said beat frequency wave to determine a navigation path.

2. A method of ascertaining the course of a craft of which comprises the steps of transmitting a first and a second carrier wave, of different frequency, from a first and a second fixed point, respectively, amplitude modulating said carrier waves by respective signal waves having the same low frequency, varying the phase relationship between said signal waves at a predetermined rate, indicating to the craft the instant at which said phase relationship goes through a predetermined value, simultaneously receiving said modulated carrier waves aboard the craft, non-linearly demodulating said received carrier waves so as to obtain a beat frequency modulated by said signal frequency, linearly demodulating said beat frequency so as to obtain the envelope thereof which includes the said signal frequency varying in amplitude as a function of said phase relationship, determining the interval between the said instant and the time at which said amplitude assumes an extreme value, and plotting a hyperbola whose foci are said first and second fixed points and whose apex is determined by the said interval, said hyperbola being the locus of all positions of the craft for which the said interval is the same.

3. The method according to claim 2 wherein said step of indicating comprises transmitting a synchronizing signal to the craft.

4. The method according to claim 2, comprising the step of selecting the difference frequency of said two carrier waves as the said beat frequency.

5. The method according to claim 4 wherein said carrier waves are selected to have a difference frequency within the audio range, said difference frequency being made audible aboard the craft to ascertain whether said carrier waves are being transmitted.

6. The method according to claim 2, comprising the further steps of transmitting a third carrier wave at a frequency different from that of said first carrier wave from a third fixed point, modulating said third carrier wave by a signal wave of said low frequency, varying the phase relationship between the signal waves modulating said first and said third carrier wave, respectively, at a predetermined rate, indicating to the craft the instant at which the phase relationship between the two last-mentioned signal waves goes through a predetermined value, simultaneously receiving said first and third modulated carrier waves aboard the craft, non-linearly demodulating the last mentioned carrier waves thus received so as to obtain a beat frequency modulated by said signal frequency, linearly demodulating the last-mentioned beat frequency so as to obtain the envelope thereof which includes the said frequency varying in amplitude, determining the interval between the last-mentioned instant and the time at which the last-mentioned amplitude assumes an extreme value, and plotting a second hyperbola whose foci are said first and third fixed points and whose apex is determined by the last-mentioned interval, the point of intersection of said two hyperbolas defining the instantaneous position of the craft.

7. The method according to claim 6 wherein the frequency of said third carrier wave is selected to be different from that of said second frequency.

8. A system of navigation comprising a first and a second fixed station spaced apart, transmission means at said first station for sending out a first carrier wave, transmission means at said second station for sending out a second carrier wave of different frequency, modulating means at said stations for modulating said two carrier waves with respective signal waves having the same low frequency, phase shifting means at one of said stations for varying the relative phase of said signal waves at a predetermined rate, a mobile station, signaling means at one of said fixed stations for indicating to said mobile station the instant when said relative phase has a predetermined value, a receiver for said carrier waves at said mobile station, non-linear detector means at said mobile station for beating together the two carrier waves so as to produce a beat frequency, linear detector means for detecting the amplitude of said beat frequency, said amplitude containing a component varying in amplitude with said phase relationship, and indicator means responsive to said component whereby a course may be determined from the interval between said instant and the time when said amplitude assumes an extreme value.

9. A system according to claim 8, comprising timer means controlling the operation of said phase shifting means, and keying means for actuating said signaling means under the control of said timer means.

10. A system of navigation comprising a main station and an auxiliary station spaced from said main station, a source of first carrier frequency at said main station, a source of second carrier frequency at said auxiliary station, a source of low frequency at said main station, first modulating means at said main station connected to said source of first carrier frequency and to said source of low frequency, a first transmitter at said main station, said modulating means being connected to said transmitter so as to apply an amplitude modulated first carrier thereto for radiation into space, second modulating means at said auxiliary station, a transmission path between said main station and said auxiliary station connecting said source of low frequency to said second modulating means, phase shifting means in said transmission path, timer means controlling the operation of said phase shifting means, a second transmitter at said auxiliary station, said second modulating means being connected to said source of second carrier frequency and to said second transmitter so as to apply to the latter an amplitude modulated second carrier for radiation into space, signaling means connected to one of said transmitters for sending out a synchronizing signal at the instant when said timer means goes through a predetermined point in its cycle of operations, a mobile station, a receiver at said mobile station for said synchronizing signal and for said first and second carrier waves, non-linear detector means at said mobile station for beating together the two carrier waves so as to produce a beat frequency, linear detector means for detecting the amplitude of said beat frequency, said amplitude containing a component varying in amplitude with said phase relationship, filter means for isolating said component, and indicator means for ascertaining when the amplitude of said component reaches a minimum whereby a course may be determined from the interval between the arrival of said synchronizing signal and the time at which said minimum is reached.

11. A system according to claim 10, further comprising switch means under the control of said timer means inserted in said transmission path, and keying means comprising a circuit located at said auxiliary station and responsive to an interruption of said transmission path by said switch means for actuating said signaling means to apply said synchronizing signal to said second transmitter.

12. A system according to claim 10, comprising an oscillator at said main station, third modulator means at said main station connected to said oscillator and to said source of first carrier frequency so as to produce said second carrier frequency, and a second transmission path between said main station and said auxiliary station connecting said third modulator means to said second modulator means, said source of second carrier frequency comprising the output end of said second transmission path.

13. A system according to claim 12 wherein said first and second transmission paths comprise a low frequency cable and a high frequency cable, respectively.

14. A system according to claim 10 wherein said source of low frequency comprises a constant-speed motor and a first alternating-current generator driven from said motor, said phase shifting means comprising a second alternating-current generator driven from said motor, said second generator having a rotatable stator whereby the phase of the output thereof may be varied, said timer means comprising transmission means connecting said rotatable stator with said motor.

15. In a navigation system, the combination according to claim 12 wherein said first and second modulating means are arranged to modulate the respective carrier waves with the same index of modulation.

16. In a navigation system, in combination, a main station and an auxiliary station spaced from said main station, a source of first carrier frequency at said main station, a source of low frequency at said main station, first modulating means at said main station connected to both of said sources, a first transmitter at said main station, said modulating means being connected to said transmitter so as to apply an amplitude modulated first carrier thereto for radiation into space, a source of second carrier frequency at said auxiliary station, second modulating means at said auxiliary station, a transmission path between said main station and said auxiliary station connecting said source of low frequency to said second modulating means, phase shifting means in said transmission path, timer means controlling the operation of said phase shifting means, a second transmitter at said auxiliary station, said second modulating means being connected to said source of second carrier frequency and to said second transmitter so as to apply to the latter an amplitude modulated second carrier for radiation into space, and signaling means connected to one of said transmitters for sending out a synchronizing signal at the instant when said timer means goes through a predetermined point in its cycle of operation.

17. In a navigation system, the combination according to claim 16 wherein said phase shifting means is arranged to vary the relative phase of said low frequency, as applied to said first and second modulating means, respectively, over an angle extending from substantially $\pi/2$ to substantially $3\pi/2$.

18. In a navigation system, the combination according to claim 16 wherein said source of low frequency is arranged to produce an oscillation of a wave length substantially four times the distance between said main station and said auxiliary station.

19. A method of ascertaining the course of a craft which comprises the steps of transmitting a first and a second carrier wave of different frequencies, from a first and a second fixed point, respectively, amplitude modulating said carrier waves by respective signal waves having the same low frequency, varying the phase relationship between said signal waves at a predetermined rate, indicating to the craft the instant at which said phase relationship goes through a predetermined value, simultaneously receiving said modulated carrier wave aboard the craft, non-linearly demodulating said received carrier waves so as to obtain a beat frequency modulated by said signal frequency, linearly demodulating said beat frequency so as to obtain the envelope thereof which includes the said signal frequency varying in amplitude as a function of said phase relationship and determining the interval between the said instant and the time at which said amplitude assumes an extreme value.

References Cited in the file of this patent

UNITED STATES PATENTS

| | | |
|---|---|---|
| 2,144,203 | Shanklin | Jan. 17, 1939 |
| 2,198,113 | Holmes | Apr. 23, 1940 |

FOREIGN PATENTS

| | | |
|---|---|---|
| 582,085 | Great Britain | Nov. 5, 1946 |